United States Patent
Tran

(10) Patent No.: US 12,288,065 B2
(45) Date of Patent: *Apr. 29, 2025

(54) MICROPROCESSOR WITH ODD AND EVEN REGISTER SETS

(71) Applicant: Simplex Micro, Inc., San Jose, CA (US)

(72) Inventor: Thang Minh Tran, Tustin, CA (US)

(73) Assignee: Simplex Micro, Inc., Austin, TX (US)

( * ) Notice: Subject to any disclaimer, the term of this patent is extended or adjusted under 35 U.S.C. 154(b) by 374 days.

This patent is subject to a terminal disclaimer.

(21) Appl. No.: 17/733,689

(22) Filed: Apr. 29, 2022

(65) Prior Publication Data
US 2023/0350679 A1 Nov. 2, 2023

(51) Int. Cl.
G06F 9/30 (2018.01)
G06F 9/38 (2018.01)

(52) U.S. Cl.
CPC ........ *G06F 9/3012* (2013.01); *G06F 9/30036* (2013.01); *G06F 9/30145* (2013.01); *G06F 9/384* (2013.01); *G06F 9/3885* (2013.01)

(58) Field of Classification Search
CPC .... G06F 9/30036; G06F 9/384; G06F 9/3885; G06F 9/3012
See application file for complete search history.

(56) References Cited

U.S. PATENT DOCUMENTS

| | | |
|---|---|---|
| 5,021,985 A | 6/1991 | Hu et al. |
| 5,185,868 A | 2/1993 | Tran |
| 5,187,796 A | 2/1993 | Wang et al. |
| 5,251,306 A | 10/1993 | Tran |
| 5,497,467 A | 3/1996 | Wakui et al. |
| 5,655,096 A | 8/1997 | Branigin |
| 5,689,653 A | 11/1997 | Karp et al. |
| 5,699,536 A | 12/1997 | Hopkins et al. |
| 5,799,163 A | 8/1998 | Park et al. |
| 5,802,386 A | 9/1998 | Kahle et al. |
| 5,809,268 A | 9/1998 | Chan |

(Continued)

FOREIGN PATENT DOCUMENTS

| | | |
|---|---|---|
| EP | 0840213 A2 | 5/1998 |
| EP | 0902360 A2 | 3/1999 |

(Continued)

OTHER PUBLICATIONS

Choi, W., Park, SJ., Dubois, M. (2009). Accurate Instruction Prescheduling in Dynamically Scheduled Processors. In: Stenström, P. (eds) Transactions on High-Performance Embedded Architectures and Compilers I. Lecture Notes in Computer Science, vol. 5470 Springer, Berlin, Heidelberg. pp. 107-127. (Year: 2009).

(Continued)

*Primary Examiner* — Zachary K Huson
(74) *Attorney, Agent, or Firm* — Appleton Luff

(57) ABSTRACT

A processor includes a plurality of register sets of a register file, and a plurality sets of functional units which are coupled by sets of dedicated read and write buses to allow parallel execution of instruction. The register sets and functional units are organized as odd and even sets. Shared buses may also be employed. The processor may also include a time counter and a time-resource matrix and provides a method for statically dispatching instructions.

25 Claims, 6 Drawing Sheets

(56) References Cited

U.S. PATENT DOCUMENTS

| | | | |
|---|---|---|---|
| 5,835,745 A | 11/1998 | Sager et al. | |
| 5,860,018 A | 1/1999 | Panwar | |
| 5,881,302 A | 3/1999 | Omata | |
| 5,903,779 A | 5/1999 | Park | |
| 5,903,919 A | 5/1999 | Myers | |
| 5,958,041 A | 9/1999 | Petolino, Jr. et al. | |
| 5,961,630 A | 10/1999 | Zaidi et al. | |
| 5,964,867 A | 10/1999 | Anderson et al. | |
| 5,974,538 A | 10/1999 | Wilmot, II | |
| 5,996,061 A | 11/1999 | Lopez-Aguado et al. | |
| 5,996,064 A | 11/1999 | Zaidi et al. | |
| 6,016,540 A | 1/2000 | Zaidi et al. | |
| 6,035,393 A | 3/2000 | Glew et al. | |
| 6,065,105 A | 5/2000 | Zaidi et al. | |
| 6,247,113 B1 | 6/2001 | Jaggar | |
| 6,282,634 B1 | 8/2001 | Hinds et al. | |
| 6,304,955 B1 | 10/2001 | Arora | |
| 6,425,090 B1 | 7/2002 | Arimilli et al. | |
| 6,453,424 B1 | 9/2002 | Janniello | |
| 7,069,425 B1 | 6/2006 | Takahashi | |
| 7,434,032 B1 | 10/2008 | Coon et al. | |
| 8,166,281 B2 | 4/2012 | Gschwind et al. | |
| 9,256,428 B2 | 2/2016 | Heil et al. | |
| 10,339,095 B2 | 7/2019 | Moudgill et al. | |
| 11,062,200 B2 | 7/2021 | Lie et al. | |
| 11,132,199 B1 | 9/2021 | Tran | |
| 11,144,319 B1 | 10/2021 | Battle et al. | |
| 11,163,582 B1 | 11/2021 | Tran | |
| 11,204,770 B2 | 12/2021 | Tran | |
| 11,263,013 B2 | 3/2022 | Tran | |
| 11,467,841 B1 | 10/2022 | Tran | |
| 11,954,491 B2 * | 4/2024 | Tran | G06F 9/3838 |
| 12,061,906 B2 | 8/2024 | Stephens et al. | |
| 2001/0004755 A1 | 11/2001 | Levy et al. | |
| 2003/0023646 A1 | 1/2003 | Lin et al. | |
| 2003/0135712 A1 | 7/2003 | Theis | |
| 2004/0073779 A1 | 4/2004 | Hokenek et al. | |
| 2004/0236920 A1 | 11/2004 | Sheaffer | |
| 2005/0251657 A1 | 11/2005 | Boucher | |
| 2006/0010305 A1 | 1/2006 | Maeda et al. | |
| 2006/0095732 A1 | 5/2006 | Tran et al. | |
| 2006/0218124 A1 | 9/2006 | Williamson et al. | |
| 2006/0259800 A1 | 11/2006 | Maejima | |
| 2006/0288194 A1 | 12/2006 | Lewis et al. | |
| 2007/0038984 A1 | 2/2007 | Gschwind et al. | |
| 2007/0255903 A1 | 11/2007 | Tsadik et al. | |
| 2007/0260856 A1 | 11/2007 | Tran et al. | |
| 2009/0158279 A1 | 6/2009 | Iino et al. | |
| 2011/0099354 A1 | 4/2011 | Takashima et al. | |
| 2011/0153987 A1 | 6/2011 | Luke et al. | |
| 2011/0320765 A1 | 12/2011 | Karkhanis et al. | |
| 2012/0047352 A1 | 2/2012 | Yamana | |
| 2012/0060015 A1 | 3/2012 | Eichenberger et al. | |
| 2012/0151156 A1 | 6/2012 | Citron et al. | |
| 2013/0151816 A1 | 6/2013 | Indukuru et al. | |
| 2013/0297912 A1 | 11/2013 | Tran et al. | |
| 2013/0346985 A1 | 12/2013 | Nightingale | |
| 2014/0059328 A1 | 2/2014 | Gonion | |
| 2014/0082626 A1 | 3/2014 | Busaba et al. | |
| 2015/0026435 A1 | 1/2015 | Muff et al. | |
| 2015/0100754 A1 | 4/2015 | Reid et al. | |
| 2015/0212972 A1 | 7/2015 | Boettcher et al. | |
| 2015/0227369 A1 | 8/2015 | Gonion | |
| 2016/0092238 A1 | 3/2016 | Codrescu et al. | |
| 2016/0275043 A1 | 9/2016 | Grochowski et al. | |
| 2016/0283240 A1 | 9/2016 | Mishra et al. | |
| 2016/0371091 A1 | 12/2016 | Brownscheidle et al. | |
| 2017/0177345 A1 | 6/2017 | Ould-Ahmed-Vall et al. | |
| 2017/0177354 A1 | 6/2017 | Ould-Ahmed-Vall | |
| 2017/0185407 A1 | 6/2017 | Shwartsman | |
| 2017/0357513 A1 | 12/2017 | Ayub et al. | |
| 2017/0371657 A1 | 12/2017 | Mahurin et al. | |
| 2018/0181400 A1 | 6/2018 | Scherbinin et al. | |
| 2018/0196678 A1 | 7/2018 | Thompto | |
| 2018/0253310 A1 | 9/2018 | Stephens | |
| 2018/0321938 A1 | 11/2018 | Boswell et al. | |
| 2019/0079764 A1 | 3/2019 | Diamond et al. | |
| 2019/0243646 A1 | 8/2019 | Anderson | |
| 2020/0004534 A1 * | 1/2020 | Gurram | G06F 9/3012 |
| 2020/0004543 A1 | 1/2020 | Kumar et al. | |
| 2020/0310796 A1 | 10/2020 | Pfister et al. | |
| 2020/0319885 A1 | 10/2020 | Eyole et al. | |
| 2020/0387382 A1 | 12/2020 | Tseng et al. | |
| 2021/0026639 A1 | 1/2021 | Tekmen et al. | |
| 2021/0311743 A1 | 10/2021 | Tran | |
| 2021/0326141 A1 | 10/2021 | Tran | |
| 2021/0389979 A1 | 12/2021 | Tran | |
| 2022/0066760 A1 | 3/2022 | Chang et al. | |
| 2023/0068637 A1 | 3/2023 | Feiste et al. | |
| 2023/0244490 A1 | 8/2023 | Tran | |
| 2023/0244491 A1 | 8/2023 | Tran | |
| 2023/0367599 A1 | 11/2023 | Waterman et al. | |

FOREIGN PATENT DOCUMENTS

| | | | |
|---|---|---|---|
| EP | 0959575 A1 | 11/1999 | |
| WO | 0010076 A1 | 2/2000 | |
| WO | 0208894 A1 | 1/2002 | |
| WO | 0213005 A1 | 2/2002 | |

OTHER PUBLICATIONS

Diavastos, Andreas & Carlson, Trevor. (2021). Efficient Instruction Scheduling using Real-time Load Delay Tracking. (Year: 2021).

J. S. Hu, N. Vijaykrishnan and M. J. Irwin, "Exploring Wakeup-Free Instruction Scheduling," 10th International Symposium on High Performance Computer Architecture (HPCA'04), Madrid, Spain, pp. 232-232 (Year: 2004).

Written Opinion of the International Searching Authority, PCT/US2023/027497, (Oct. 20, 2023).

Written Opinion of the International Searching Authority, PCT/US2022/052185, (Apr. 14, 2023).

Written Opinion of the International Searching Authority, PCT/US2023/018970, (Jun. 28, 2023).

Written Opinion of the International Searching Authority, PCT/US2023/018996, (Mar. 7, 2023).

Anonymous: "RISC-V—Wikipedia", Apr. 16, 2022 (Apr. 16, 2022), XP093142703, Retrieved from the Internet: URL:https://en.wikipedia.org/w/index.php?title=RISC-V&oldid=1083030760 [retrieved on Mar. 27, 2024].

PCT/US2023/018996, Written Opinion of the International Preliminary Examining Authority, Apr. 8, 2024.

PCTUS2023081682, Written Opinion of the International Searching Authority, Mar. 22, 2024.

Written Opinion of The International Preliminary Examining Authority, PCTUS2023/018970, Mar. 25, 2024.

U.S. Appl. No. 17/588,315, filed Jan. 30, 2022, Thang Minh Tran.

U.S. Appl. No. 17/672,622, filed Feb. 15, 2022, Thang Minh Tran.

H. O. Kultala et al., "Exposed datapath optimizations for loop scheduling," 2017 International Conference on Embedded Computer Systems: Architectures, Modeling, and Simulation (SAMOS), Pythagorion, Greece, pp. 171-178 (Year: 2017).

PCT/US2023/018970, International Preliminary Report on Patentability, Jul. 18, 2024.

PCT/US2023/018996, International Preliminary Report on Patentability, Jul. 19, 2024.

Wang, Y., Jia, Z., Chen, R., Wang, M., Liu, D. and Shao, Z., Loop scheduling with memory access reduction subject to register constraints for DSP applications. Softw. Pract. Exper., pp. 999-1026. (Year: 2014).

* cited by examiner

FIG. 4

MICROPROCESSOR WITH ODD AND EVEN REGISTER SETS

RELATED APPLICATIONS

This application is related to the following U.S. patent application which is hereby incorporated by reference in its entirety: U.S. patent application Ser. No. 17/588,315, filed Jan. 30, 2022, entitled "Microprocessor With Time Counter For Statically Dispatching Instructions."

BACKGROUND

Technical Field

The present invention relates to the field of computer processors. More particularly, it relates to issuing and executing instructions in a processor where the processor consists of a general-purpose microprocessor, a digital-signal processor, a single instruction multiple data processor, a vector processor, a graphics processor, or other type of microprocessor which executes instructions.

Technical Background

Processors have become increasingly complex chasing small increments in performance at the expense of power consumption and semiconductor chip area. The approach in out-of-order (OOO) superscalar microprocessors has remained basically the same for the last 25-30 years, with much of the power dissipation arising from the dynamic scheduling of instructions for execution from the reservation stations or central windows. Designing an OOO superscalar microprocessor is a huge undertaking. Hundreds of instructions are issued to the execution pipeline where the data dependencies are resolved and arbitrated for execution by a large number of functional units. The result data from the functional units are again arbitrated for the write buses to write back to the register file. If the data cannot be written back to the register file, then the result data are kept in temporary registers and a complicated stalling procedure is performed for the execution pipeline.

One method to improve performance is adding more functional units. This requires larger register files and more read and write ports to the register file. The large number of read/write ports improve performance but critically increase the chip area. In some cases, routing of the additional read and write buses through the register file and additional functional units is difficult and increases chip area. The disadvantages are even greater in a vector processor where the register file dominates the chip area, especially if the register data width is large, e.g., 512 bits to 4K bits with many read and write buses and many functional units.

Thus, there is a need for a superscalar microprocessor which consumes less power, has a simpler design, has an effective design for the register file, and is scalable with consistently high performance.

SUMMARY

In high performance microprocessors or vector processors where multiple instructions or operations are executed per clock cycle, the register file requires a large number of read and write ports. As the instructions are decoded, the destination registers are renamed to allow out-of-order execution. A physical register file consists of the architectural registers as defined by the instruction set architecture and various temporary registers for renaming. For example, the physical register file may have 96 entries which consists of 32 architectural registers and 64 temporary registers. In some high-performance processors, the physical register file may have 8 read ports and 6 write ports, which are very expensive in area. Furthermore, the increased number of functional units makes routing of the read and write buses inefficient.

In one embodiment of the processor described herein, the physical register file is structured as 2 sets of registers, 48 odd registers and 48 even registers, with each set of registers having 4 read ports and 3 write ports. In some cases, the splitting the register file into 2 register sets with half the number of read and write ports can reduce the total area required for the registers by about 50%. Thus, the processor chip area is greatly reduced while retaining improved performance. The functional units are designated as odd or even functional units and are coupled to the odd or even register set.

In one embodiment, the destination register of an instruction is renamed to odd or even if the source registers for the instruction are odd or even, respectively. This arrangement can be particularly beneficial in processing a basic block of code where a basic block is defined as a straight-line code sequence with no branches in except to the entry, and no branches out except at the exit. The renaming may alternate between the odd and even register sets for each basic-block of codes. Basic blocks of code sequences are often found in artificial intelligent and machine learning applications where loops are used extensively. The registers in the odd/even loop iterations are renamed to be the odd or even registers. The odd loop iteration uses the odd register set and odd functional units and the even loop iteration uses the even register set and even functional units. Two iterations are executed in parallel to double the performance with half the number of read and write ports for each register set. In one embodiment, the vector registers are grouped by 2, 4, or 8 vector registers and the vector instructions operate on the vector register groups. The odd vector register set and the odd vector functional units execute vector operations in parallel with the even vector register set and the even vector functional units, thus doubling the performance of vector instructions. The area saving for routing of 512 to 4096-bit buses to a large set of vector functional units is substantial, and in some cases the bus routing would have otherwise been impossible.

The resources in the time-resource matrix are structured accordingly for the odd and even registers. For example, 3 read buses and 2 write buses are dedicated to instructions with even register references and even functional units, 3 read buses and 2 write buses are dedicated to instructions with odd register references and odd functional units, and 2 read buses and 2 write buses are shared by the register file and both odd and even functional units. The split up of the resources of the same type (read buses, write buses) permits better scalability and parallel execution of instructions in odd and even functional units.

The foregoing may be employed in a processor that includes a time counter which stores a time count incremented every clock cycle representing a current time of the processor, a time-resource matrix to indicate what resources are available at every time count, an instruction issue unit for receiving a first instruction and issuing the first instruction with a preset execution time based on the time count and the availability of the needed resources, and an execution queue for receiving the first instruction from the instruction unit and dispatching the first instruction to a functional unit when the preset execution time is the same as the time count. Such an embodiment employs static scheduling of instructions. A static scheduling algorithm is based on the assumption that a new instruction has a perfect view of all previous instructions in the execution pipeline, and thus it can be scheduled for execution at an exact time in the future, e.g., with reference to a time count from a counter. Assuming an instruction has 2 source operands and 1 destination operand, the instruction can be executed out-of-order when conditions are met of (1) no data dependency, (2) availability of read buses to read data from the register file, (3) availability of a functional unit to execute the instruction, and (4) availability of a write bus to write result data back to the register file.

BRIEF DESCRIPTION OF THE DRAWINGS

Aspects of the present invention are best understood from the following description when read with the accompanying figures.

FIG. 4 is a block diagram illustrating a time-resource matrix;

DETAILED DESCRIPTION

Figure 1:
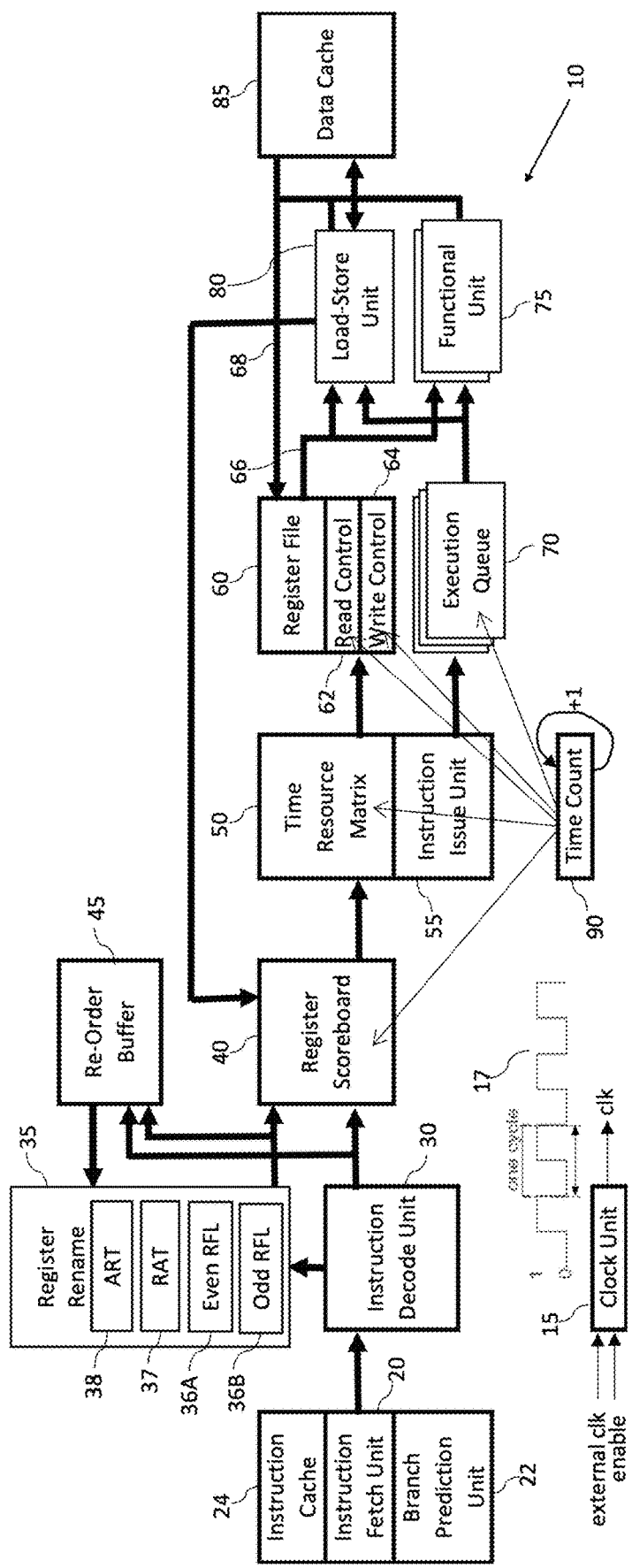
FIG. 1 is a block diagram illustrating a processor based data processing system in accordance with present invention.

The following description provides different embodiments for implementing aspects of the present invention. Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

In one embodiment a processor is provided, typically implemented as a microprocessor, that schedules instructions to be executed at a preset time based on a time count from a time counter. In such a microprocessor the instructions are scheduled to be executed using the known throughput and latency of each instruction to be executed. For example, in one embodiment, the ALU instructions have throughput and latency times of 1, the multiply instructions have throughput time of 1 and a latency time of 2, the load instructions have the throughput time of 1 and a latency time of 3 (based on a data cache hit), and the divide instruction have throughput and latency times of 32.

FIG. 1 is a block diagram of a microprocessor based data processing system. The exemplary system includes a microprocessor 10 having an instruction fetch unit 20, an instruction cache 24, a branch prediction unit 22, an instruction decode unit 30, a register renaming unit 35, a register scoreboard 40, a re-order buffer 45, a time-resource matrix 50, an instruction issue unit 55, a register file 60, a read control unit 62, a write control unit 64, a plurality of execution queues 70, a plurality of functional units 75, a load-store unit 80, a data cache 85, and a co-processor 100. The microprocessor 10 includes a plurality of read buses 66 coupling the register files to the functional units 75 and load-store unit 80. The system also includes a plurality of write buses 68 to write result data from the functional unit 75, the load-store unit 80, and the data cache 85 to the register file 60. The microprocessor 10 is a synchronous microprocessor where the clock unit 15 generates a clock signal ("clk") which couples to all the units in the microprocessor 10. The clock unit 15 provides a continuously toggling logic signal 17 which toggles between 0 and 1 repeatedly at a clock frequency. Clock output signal ("clk") of clock unit 15 enables synchronizing many different units and states in the microprocessor 10. The clock signal is used to sequence data and instructions through the units that perform the various computations in the microprocessor 10. The clock unit 15 may include an external clock as an input to synchronize the microprocessor 10 with external units (not shown). The clock unit 15 may further receive an enable signal to disable the clock unit when the microprocessor is in an idle stage or otherwise not used for instruction execution.

According to an embodiment the microprocessor 10 also includes a time counter unit 90 which stores a time count incremented, in one embodiment, every clock cycle. The time counter unit 90 is coupled to the clock unit 15 and uses "clk" signal to increment the time count. In one embodiment the time count represents the time in clock cycles when an instruction in the instruction issue unit 55 is scheduled for execution. For example, if the current time count is 5 and an instruction is scheduled to be executed in 22 cycles, then the instruction is sent to the execution queue 70 with the execution time count of 27. When the time count increments to 26, the execution queue 70 issues the instruction to the functional unit 75 for execution in next cycle (time count 27). The time counter unit 90 is coupled to the register scoreboard 40, the time-resource matrix 50, the read control 62, the write control 64, and the plurality of execution queues 70.

The scoreboard 40 resolves data dependencies in the instructions. The time-resource matrix 50 checks availability of the various resources which in one embodiment include the read buses 66, the functional units 75, the load-store unit 80, and the write buses 68. The read control unit 62, the write control unit 64, and the execution queues 70 receive the corresponding scheduled times from the instruction issue unit 55. The read control unit 62 is set to read the source operands from the register file 60 on specific read buses 66 at a preset time. The write control unit 64 writes the result data from a functional unit 75 or the load-store unit 80 or the data cache 85 to the register file 60 on a specific write bus 68 at a preset time discussed below. The execution queue 70 is set to dispatch an instruction to a functional unit 75 or the load-store unit 80 at a preset time. In each case, the preset time is the time setup by the instruction decode unit 30. The preset time is a future time based on the time count, so when the time count counts up to the future preset time, then the specified action will happen, where the specified action is reading data from the register file 60, writing data to the register file 60, or issuing an instruction to a functional unit 75 for execution. The instruction decode unit 30 determines that the instruction is free of any data dependency. The resource is available to set the "preset time" for the instruction to be executed in the execution pipeline.

In the microprocessor system 10, the instruction fetch unit 20 fetches the next instruction(s) from the instruction cache 24 to send to the instruction decode unit 30. One or more instructions can be fetched per clock cycle from the instruction fetch unit depending on the configuration of microprocessor 10. For higher performance, an embodiment of microprocessor 10 fetches more instructions per clock cycle for the instruction decode unit 30. For low-power and embedded applications, an embodiment of microprocessor 10 might fetch only a single instruction per clock cycle for the instruction decode unit 30. If the instructions are not in the instruction cache 24 (commonly referred to as an instruction cache miss), then the instruction fetch unit 20 sends a request to external memory (not shown) to fetch the required instructions. The external memory may consist of hierarchical memory subsystems, for example, an L2 cache, an L3 cache, read-only memory (ROM), dynamic random-access memory (DRAM), flash memory, or a disk drive. The external memory is accessible by both the instruction cache 24 and the data cache 85. The instruction fetch unit is also coupled with the branch prediction unit 22 for prediction of the next instruction address when the branch is detected and predicted by the branch prediction unit 22. The instruction fetch unit 20, the instruction cache 24, and the branch prediction unit 22 are described here for completeness of a microprocessor 10. In other embodiments, other instruction fetch and branch prediction methods can be used to supply instructions to the instruction decode unit 30 for microprocessor 10.

The instruction decode unit 30 is coupled to the instruction fetch unit 20 to receive new instructions and is also coupled to the register renaming unit 35 and the register scoreboard 40. The instruction decode unit 30 decodes the instructions for instruction type, instruction throughput, latency times, and register operands. The register operands, for example, may consist of 2 source operands and 1 destination operand. Each operand is referenced to a register in the register file 60. The source and destination registers are used here to store the source and destination operands of the instruction. The source registers support solving read-after-write (RAW) data dependencies. If a later instruction has the same source register as the destination register of an earlier instruction, then the later instruction has RAW data dependency. The later instruction must wait for completion of the earlier instruction before it can start execution.

Other data dependencies for the instructions include the write-after-write (WAW) and write-after-read (WAR). The WAW data dependency occurs when 2 instructions write back to the same destination register. The WAW dependency restricts the later instruction from writing back to the same destination register before the earlier instruction is written to it. To address the WAW dependency, every destination register is renamed by the register renaming unit 35 where the later instruction is written to a different register from the earlier register, thus eliminating the WAW data dependency. For example, if three instructions have the same destination register R5, and which are renamed to R37, R68, R74 then the three instructions can write to the destination register at any time. Without renaming, all three instructions will try to write to the same register R5 which is a WAW dependency in that the third instruction cannot write to R5 before the second instruction, which cannot write to R5 before the first instruction.

The register renaming unit 35 also eliminates the WAR data dependency where the later instruction cannot write to a register until the earlier instruction reads the same register. Since the destination register of the later instruction is renamed, the earlier instruction can read the register at any time. In such an embodiment, as the destination registers are renamed, the instructions are executed out-of-order and written back to the renamed destination register out-of-order. The register scoreboard 40 is used to keep track of the completion time of all destination registers. In a preferred embodiment the completion time is maintained in reference to the time count 90.

In one embodiment, the register renaming unit 35 consists of an even register free list (RFL) 36A, an odd register free list (RFL) 36B, a register alias table (RAT) 37, and an architectural register table (ART) 38. In the below description, the reference numbers for the register free lists 36A and 36B are referred to using only reference numeral 36 to simplify the explanation. In one embodiment, an instruction set architecture with 32-entry architectural registers has 96 temporary registers for renaming, for a total of 128 physical registers, which comprise the register file 60. The architectural registers from the instructions are mapped into the physical register file 60 which the issue and execute pipelines of the microprocessor 10 uses to execute instructions based on the registers in register file 60. In the above-described embodiment, register scoreboard 40 keeps the write back time for the 128 physical registers. The register scoreboard 40 is associated with the physical register file 60. The RFL 36 keeps track of temporary registers (96 registers in this example) which have not been used. As the destination register of an instruction is renamed, a register in the register free list 36 is used for renaming. The register alias table 37 stores the latest renamed registers of the architectural registers. For example, if register R5 is renamed to be temporary register R52, then the register alias table 37 stores the renaming of R5 to R52. Thus, any source operand which references to R5 will see R52 instead of R5. As the architectural register R5 is renamed to R52, eventually when register R52 is retired, the architectural register R5 becomes R52 as stored in the architectural register table 38, and register R5 is released to the RFL 36. The register scoreboard 40 indicates the earliest time for availability of a source register of the register file 60.

As stated above, in one embodiment, the register free list 36 is organized as an even RFL 36A and an odd RFL 36B. One algorithm for renaming the destination register is based on and follows renaming of the source registers. The source registers access the RAT 37 for the rename registers and if in the particular embodiment, the rename registers are assigned as even or odd, then the destination register is renamed with even or odd registers from the even RFL 36A or the odd RFL 363, respectively. If the renamed source registers are both odd and even, then the destination register can alternatively use the odd RFL 36B or even RFL 36A. In another embodiment, the destination registers are renamed based on alternative basic block of instructions where a basic block is defined as a straight-line code sequence with no branches in, except to the entry, and no branches out, except at the exit. In such an embodiment, a basic block will be assigned to either and odd or even register set. In another embodiment, a loop is a basic block in which the target address at the exit point is the same as the entry point. The destination registers of the instructions in the loop are alternatively renamed to even and odd registers from the even RFL 36A or the odd RFL 36B per loop iteration. The register file 60 and the RFL 36 are structured with 2 register sets, even and odd, for ease of description, but the register file 60 and the RFL 36 can have more than 2 register sets.

Figure 2:
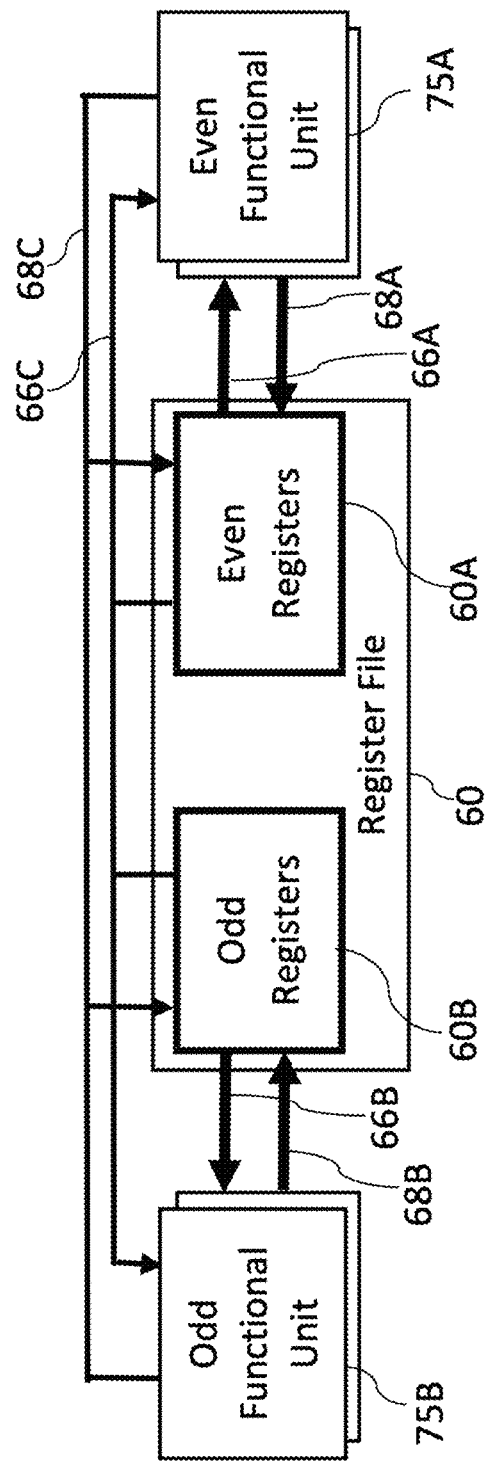
FIG. 2 is a block diagram illustrating a register file with odd and even register sets and multiple odd and even functional units.

FIG. 2 also illustrates an arrangement of register sets and functional units in a vector processor embodiment. The even and odd register sets are more important in a vector processor because of the register data width of the vector register file which can be 512-bit to 4096-bit, or larger. Each vector register consists of many elements of arbitrary size, e.g., 8-bit, 16-bit, 32-bit, or 64-bit, wherein the element width is programmable, and all elements of the vector register are executed in parallel by a vector functional unit of the same size. For example, a vector register width of 512-bits may have 32 elements of 16-bits, and a vector ALU functional unit may have 32 16-bit adders. The vector register file and routing of the large number of read and write buses dominate the area of the vector processor. Renaming of vector registers is expensive because of the vector register data width but register renaming is necessary for speculative execution of instructions. In one embodiment, a vector processor executes vector instructions after being retired by the re-order buffer 45 so that vector instructions are executed our-of-order, but not speculatively executed (where register renaming is not necessary). In a vector instruction set, the vector registers can be grouped together in the vector instructions. For example, the vector registers can be grouped by 2×, 4×, or 8× where the reference to vector register 8 (v8) means v8-v9, v8-v11, or v8-v15, respectively. For example, with 4× grouping, a vector add instruction adds the contents of 4 vector registers to the contents of 4 other vector registers and writes back to 4 destination vector registers. One approach to improving the vector performance is to double the number of vector functional units so that 2 sets of vector registers, even and odd, are executed at the same time when vector registers are grouped. The even and odd register sets with dedicated read and write buses to the even and odd functional units, doubles the vector performance with minimal increase in area.

In one embodiment, if instructions are executed out-of-order, then the re-order buffer 45 is used to ensure correct program execution. The register renaming 35 and the instruction decode unit 30 are coupled to the re-order buffer 45 to provide the order of issued instructions and the latest renaming of all architectural registers. The re-order buffer 45 is needed to retire the instructions in order regardless of when the instructions are executed and written back to the register file 60. In one embodiment, re-order buffer 45 takes the form of a first in first out (FIFO) buffer. Inputs are instructions from the decode unit 30 and instructions are retired in order after completion by the functional unit 75 or the load store unit 80. In particular, the re-order buffer 45 flushes all instructions after a branch misprediction or instruction exception. The ART 38 is updated only with the instructions before a branch misprediction or instruction exception. Another function of the re-order buffer 45 is writing data to memory only in accordance with the order of the load and store execution. The data memory (including data cache 85 and external memory) are written in order by retiring of the store instructions from the re-order buffer 45. Retiring of store instructions is performed in order from the store buffer (not shown) in the load store unit 80.

Each of the units shown in the block diagram of FIG. 1 can be implemented in integrated circuit form by one of ordinary skill in the art in view of the present disclosure. With regard to one embodiment of this invention, time counter 90 is a basic N-bit wrap-around counter incrementing by 1 every clock cycle. The time-resource matrix 50 is preferably implemented as registers with entries read and written as with a conventional register structure.

The integrated circuitry employed to implement the units shown in the block diagram of FIG. 1 may be expressed in various forms including as a netlist which takes the form of a listing of the electronic components in a circuit and the list of nodes that each component is connected to. Such a netlist may be provided via an article of manufacture as described below.

In other embodiments, the units shown in the block diagram of FIG. 1 can be implemented as software representations, for example in a hardware description language (such as for example Verilog) that describes the functions performed by the units of FIG. 1 at a Register Transfer Level (RTL) type description. The software representations can be implemented employing computer-executable instructions, such as those included in program modules and/or code segments, being executed in a computing system on a target real or virtual processor. Generally, program modules and code segments include routines, programs, libraries, objects, classes, components, data structures, etc. that perform particular tasks or implement particular abstract data types. The program modules and/or code segments may be obtained from another computer system, such as via the Internet, by downloading the program modules from the other computer system for execution on one or more different computer systems. The functionality of the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a non-transitory computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The aforementioned implementations of software executed on a general-purpose, or special purpose, computing system may take the form of a computer-implemented method for implementing a microprocessor, and also as a computer program product for implementing a microprocessor, where the computer program product is stored on a non-transitory computer readable storage medium and include instructions for causing the computer system to execute a method. The aforementioned program modules and/or code segments may be executed on suitable computing system to perform the functions disclosed herein. Such a computing system will typically include one or more processing units, memory and non-transitory storage to execute computer-executable instructions.

FIG. 2 illustrates details of an embodiment of the register file 60 with an even register set 60A and an odd register set 60B, multiple even functional units 75A, and multiple odd functional units 75B. The preset time in reference throughout this description is based on a future time with respect to the time count 90 where the instruction is free of data dependency and has available resources. The preset time can be the read time for source operands of the instruction from the register file 60, or the execution time of the instruction, or the write time to write result data back to the register file 60. The read control unit 62 is set to read the source operands from the even register set 60A on specific read buses 66A at a preset time to provide to the even functional units 75A. The read control unit 62 is set to read the source operands from the odd register set 60B on specific read buses 66B at a preset time to provide to the odd functional units 75B. In one embodiment, the read control unit 62 is also set to read the source operands from either the even register set 60A or the odd register set 60B on specific shared read buses 66C at a preset time to either the even functional units 75A or the odd functional units 75B. The write control unit 64 writes the result data from an even functional unit 75A to the even register set 60A on a specific write bus 68A at a preset time. The write control unit 64 writes the result data from an odd functional unit 75B to the odd register set 60B on a specific write bus 68B at a preset time. In one embodiment, the write control unit 64 also writes the result data from either an even functional unit 75A or an odd functional unit 75B to the even register set 60A or the odd register set 60B on a specific shared write bus 68C at a preset time. The reference numbers for the register set 60A and 60B, the functional units 75A and 75B, the read buses 66A, 66B and 66C, and the write buses 68A, 68B and 68C are simplified to 60, 75, 66, and 68 as shown in FIG. 1 in the description for brevity. In one embodiment, the microprocessor 10 has at least 2 functional units for each type of instruction including 2 load-store ports for the load-store unit 80 and data cache 85. In one embodiment, the even, odd, and shared buses are coupled to the register file 60 and the 2 even/odd load-store ports of the load-store unit 80 in the same manner as the functional units 75. In another embodiment, a single functional unit 75 is coupled to the register file 60 through the shared read buses 66C and shared write buses 68C.

As an example, the buses consist of 3 read buses 66A and 2 write buses 68A for the even register set 60A and even functional units 75A, 3 read buses 66B and 2 write buses 68B for the odd register set 60B and odd functional units 75B, and the 2 shared buses 66C and 1 write bus 48C for register file 60 and all functional units 75. The even and odd functional units include the even and odd load-store port of the load-store unit 80, respectively.

FIG. 2 also contemplates the organization for the vector register sets and vector functional units where the performance is doubled by parallel execution of the even and odd vector registers. While the even and odd register sets are used for ease of the description, the RFL 36A can be configured to the first half of the registers of the register file 60 and the RFL 36B can be configured to the second half of the registers of the register file 60.

Figure 3:
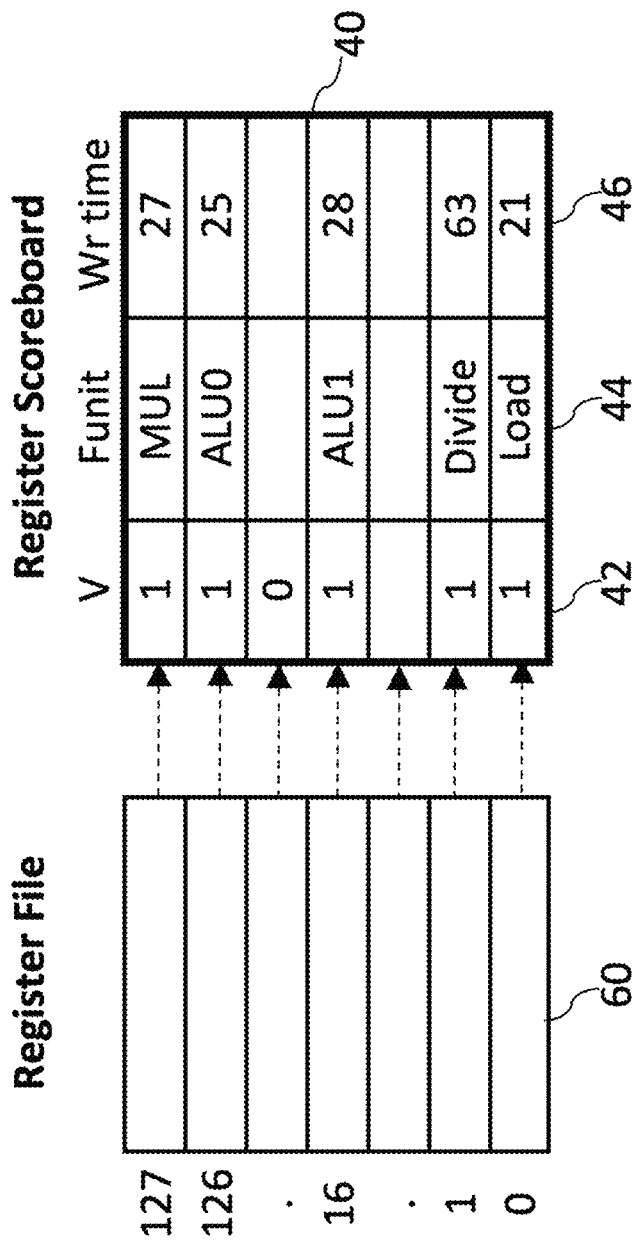
FIG. 3 is a block diagram illustrating a register file and a register scoreboard.

FIG. 3 illustrates details of the register file 60 and the register scoreboard 40. In one embodiment, the register file 60 has 128 registers, numbered as registers 0 to 127 as illustrated. Each register in the register file 60 has a corresponding entry in the register scoreboard 40. The register scoreboard 40 stores the pending write status for the registers 60. A valid bit field 42 indicates a valid write back to the register file 60 at a future time in reference to the time count 90, as specified by the write time field 46 from a specific functional unit in the "Funit" field 44. As examples illustrated in FIG. 3, register 0 is written back at time count 21 from the load-store unit 80. Register 1 is written back at time count 63 from the divide unit (one of the functional units 75). Register 16 is written back at time count 28 from the ALU1, (another of the functional units 75), etc. as illustrated in FIG. 3. The write time 46 is the time in reference to the time count 90. The result data is written to the register file 60. The data is not available from the register file 60 until next clock cycle, but the result data can be forwarded from the functional unit 44 in the register scoreboard 40. For example, if the value of the time count 90 is 19, then the load-store unit 80 produces the result data in 2 clock cycles for writing back to the register file 60 at time count 21.

The write time of a destination register is the read time for the subsequent instruction with RAW data dependency on the same destination register. Referring back to FIG. 1, the source registers of an instruction in the instruction decode unit 30 access the register scoreboard 40 for the read times. If the valid bit 42 of a source register is not set in the register scoreboard 40, then the data in the register file 60 and can be accessed at any time provided availability of the read buses 66, otherwise the write time 46 is the earliest time to issue the instruction.

An instruction reads source operand data at read time, executes the instruction with a functional unit 75 at execute time, and writes the result data back to the register file 60 at write time. The write time is recorded in the write time field 46 of the register scoreboard 40. With 2 source registers, the instruction selects the later write time from the register scoreboard 40 as the read time for the instruction. The execute time is the read time plus 1 time count where the functional unit 75 or the load-store unit 80 starts executing the instruction. The write time of the instruction is the read time plus the instruction latency time. If the instruction latency time is 1 (e.g., an ALU instruction), then the write time and execution time of the instruction are the same.

Each instruction has an execution latency time. For example, the add instruction has a latency time of 1, the multiply instruction has a latency time of 2, and the load instruction has a latency time of 3 assuming a data cache hit. In another example, if the current time count is 5 and the source registers of an add instruction receive write time counts of 22 and 24 from the register scoreboard 40, then the read time count is set at 24. In this case, the execution and the write time counts are both 25 for the add instruction. As shown in FIG. 1, the register scoreboard 40 is coupled to the time-resource matrix 50 where the read, execute, and write phases of an instruction access the time-resource matrix 50 for availabilities of the resources.

Figure 4:
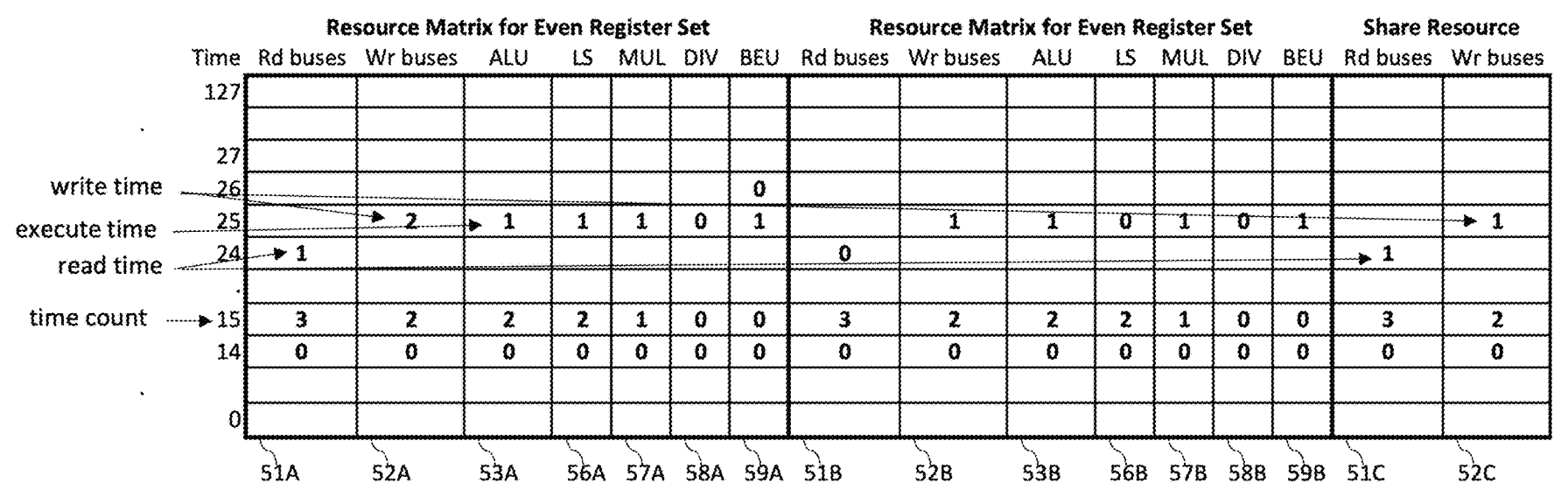

FIG. 4 illustrates details of the time-resource matrix 50. The time-resource matrix 50 preferably includes the same number of time entries as the time counter 90. For example, if the time counter 90 returns to zero after 128 cycles, then the time-resource matrix 50 preferably has 128 entries. The time counter is incremented every clock cycle and rotates back from the $127^{th}$ entry to the $0^{th}$ entry. The columns in the time-resource matrix 50 represent the availability of specific resources. In the embodiment shown in FIG. 4, the time-resource matrix 50 is arranged to identify the availability of resources by identifying the resources that are busy, and specifically the read buses 51A, 51B, and 51C, the write buses 52A, 52B, and 52C, the ALUs 53A and 53B, the load-store ports 56A and 56B, the multiply unit 57A and 57B, the divide unit 58A and 59B, and the branch execution unit (BEU) 59A and 59B. These resources are an example and if other functional units are provided by microprocessor 10 those are also included in the resource matrix 50. The even resources designated with the "A" are used by instructions associated with the even register set 60A and the even functional units 75A. The odd resources designated with the "B" are used by instructions associated with the odd register set 60B and the odd functional units 75B. The shared resources designated with the "C" are used by the register file 60 and all functional units 75. In the following description, the reference numbers for the resources with "A", "B", and "C" are used without the letter references for simplicity of explanation.

The read buses column 51 corresponds to the plurality of read buses 66 in FIG. 1. The write buses column 52 corresponds to the plurality of write buses 68 in FIG. 1. The ALUs column 53, the multiply column 57, the divide column 58, and the branch execution unit column 59 correspond to the plurality of functional units 75 of FIG. 1. The load-port ports column 56 corresponds to the load-store unit 80 of FIG. 1. The load instructions are issued from the instruction issue unit 55 with the expectation of data being in the data cache 85 (data cache hit). In one embodiment, when the data is not present in the data cache 85, then the load instruction changes the write time in the register scoreboard 40 for latency time of a level-2 cache. The instructions that are dependent on the destination register of the replay load instruction are also replayed. The same procedure is used for replaying instructions, the new replay read time, replay execute time, and replay write time must check the time-resource matrix 50 for availability of resources. The replay instructions are statically scheduled for execution with the same procedure as issued instructions.

In one embodiment, an instruction is referred to as an even instruction if the destination registers are in the even register set 60A and the instruction is to be executed by the even functional units 75A. The Instruction Issue Unit 55 checks for an even instruction the even resources for availability at the specific read, execute, and write times to dispatch the instruction to the execution queue 70. If the even instruction references to a register in the odd register set 60B, then the shared resources 51C and 52C are checked for availability to dispatch the instruction to the execution queue 70. Similarly, an instruction is referred to as an odd instruction if the destination registers are in the odd register set 60B and is designated to be executed by odd functional units 75B. The Instruction Issue Unit 55 for the odd instruction checks the odd resources and possibly the shared resources to issue the instruction. In one embodiment, the shared resource can be used by the even instruction for a register in the even register set 60A where the shared resources provide some flexibility for not stalling the instruction in the issue unit 55.

FIG. 4 also shows an example of the information in the time-resource matrix 50. Shown is data with a read time count of 24, an execution time count of 25, and a write time count of 25. When an even instruction accesses the time-resource matrix 50 for availability of resources, the matrix 50 shows that at read time 24, 1 even read bus and 1 shared read bus are busy, at execution time 25, 1 even ALUs, 1 even load-store port, 1 even multiply unit, and 1 even BEU are taken for execution of previous instructions, and at write time 25, 2 even write buses and 1 shared write bus are busy. In one embodiment, the numbers of even resources for read buses, write buses, ALUs, load/store ports, multiply unit, divide unit, and BEU are 3, 2, 1, 1, 1, 1, and 1, respectively. In such an embodiment the numbers of shared resources for read buses and write buses are 2 and 2, respectively. If an add instruction with 2 source registers and 1 destination register is issued with read time of 24, execution time of 25, and write time of 25, then the number of even read buses 51A at time 24, shared write buses 52C at time 25, and even ALUs 53A at time 25 are incremented to 3, 2, and 2, respectively. Since the number of even write buses 52A is at maximum, the add instruction uses the shared write bus 52C to write data back to the even register set 50A. The shared write bus 52C is used in this example, but the operation also applies to the shared read bus 51C which can be used if the number of even read buses 51A is at maximum. The source registers of the add instruction will receive data from the even read buses numbers 1 and 2, even ALU number 1 is used for execution of the add instruction and shared write bus number 1 is used to write back data from even ALU 1. The counts in the row are reset by the time count. As illustrated in FIG. 4, when the time count is incremented from 14 to 15, all resource counts of row 14 are reset. All resource counts of row 15 are reset when the count is incremented to 16 in next cycle. In the embodiment of FIG. 4 resources are assigned to the issued instruction in-order of the resource count. If an issued instruction is a multiply instruction with execution time of 25, since there is only one multiply unit 57A, the issued instruction cannot be issued for execution time of 25. In another embodiment, two read times, two execution times, and two write times are used per instruction with expectation that one set of times is free of conflict, increasing the chance for instruction issuing. In another embodiment, the counts indicate the number of available resources. The resource counts are decremented if the resource is assigned to an issue instruction.

In one embodiment, each resource represented in the time-resource matrix 50 is implemented as an independent register file where the number of entries is the same as the time counter 90, and each entry consists of a resource count. The issue or replay instruction accesses individual resources as needed, instead of accessing all resources in the time-resource matrix.

The availability of all resources for the required times are read by the instruction issue unit 55 from the time-resource matrix 50 and sent to the instruction issue unit 55 for a decision of when to issue an instruction to the execution queue 70. If the resources are available at the required times, then the instruction can be scheduled and sent to the execution queue 70. The issued instruction updates the register scoreboard 40 with the write time and updates the time-resource matrix 50 to reduce the available resource values. All resources must be available at the required time counts for the instruction to be dispatched to the execution queue 70. If all resources are not available, then the required time counts for the instruction in question are incremented by one, and the time-resource matrix 50 is checked as soon as the same cycle or next cycle. The particular number of read buses 66, write buses 68, and functional units 75 in FIG. 1 is preferably chosen to minimize stalling of instructions in the instruction issue unit 55.

Figures 5A, 5B:
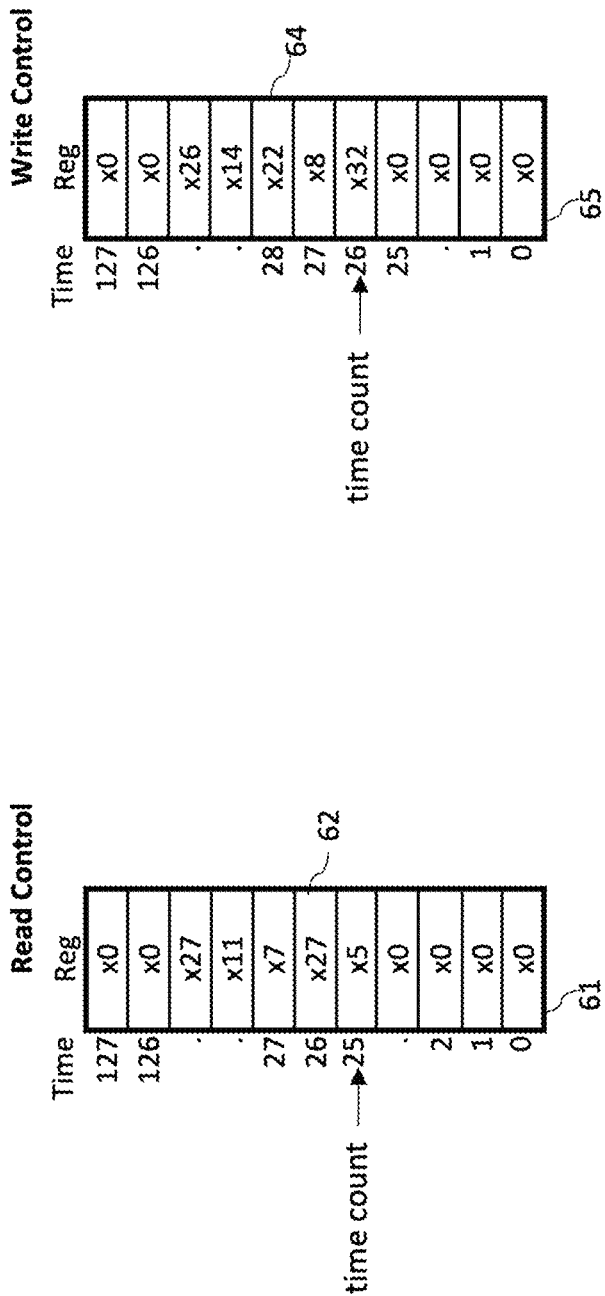
FIG. 5A and FIG. 5B are block diagrams illustrating a read bus control and a write bus control.

FIG. 5A illustrates a single read bus of the read control unit 62 and FIG. 5B a single write bus of the write control unit 64. The read control unit 62 and the write control unit 64 include a number of time entries to match the time counter 90. As mentioned above, in a preferred embodiment the time count is incremented every clock cycle. The columns in the read control unit 62 represent the source register 61. The column in the write control unit 64 represents the destination registers in the write bus 65. In one embodiment, microprocessor 10 uses the RISC-V instruction set architecture. In that architecture register 0 (x0) is not a real register; reading of register x0 returns 0 and writing to register x0 is ignored. The x0 register is used as an invalid read and write to the register file 60. If a different instruction set architecture is used, then the read control unit 62 and the write control unit 64 can include another column of valid bits (not shown) to indicate a valid read or write, respectively. As illustrated in FIGS. 5A and 5B, when the time count is incremented from 25 to 26, the register fields 61 and 65 of row 25 will be reset to x0. The register fields 61 and 65 of row 26 are reset to x0 when the count is incremented to 27 in next cycle. FIGS. 5A and 5B show a single read bus 66 and a single write bus 68, respectively. If, however, 4 read buses and 3 write buses are implemented, then FIGS. 5A and 5B are duplicated 4 times and 3 times, respectively.

In the example illustrated in FIG. 5A, at the time count of 25 the register x5 from the register field 61 of the read control 62 is used to read the entry 5 from the register scoreboard 40 for the valid bit 42, the "Funit" 44, and the write time 46. If the valid bit 42 is set and the write time 46 is equal to the time count 90, then the data is forwarded from the "Funit" 44 instead of reading from the register file 60. If the valid bit 42 is reset, then the data is read from the register file 60. If the valid bit 42 is set, and the write time 46 is greater than the time count 90, then the instruction is replayed where the write time 46 is the read time for the replay instruction. The replay instruction will access the time-resource matrix 50 to reissue the instruction to the replay execution queue. In the next cycle, when the time count is 26, the register x27 from the register field 61 is used to read from the register file 60. The read control unit 62 is responsible for supplying the source operand data on a specific one of the read buses 66. The execution queue 70 keeps the information of which one of the read buses 66 is to receive source operand data. The execution queues 70 and read control unit 62 are synchronized based on the time-resource matrix 50. The read control unit 62 provides centralized control for the read buses 66, thus reducing complexity from the hundreds of instructions in dynamic scheduling. Similarly, in FIG. 5B, the register x32 from the register field 65 of the write control unit 64 at time count of 26 is used to write to the register file 60. The register x32 will also access the "Funit" 44 of the register scoreboard 40 to get the result data from a specific functional unit 75. Again, the execution queues 70, the functional units 75, and the write control unit 64 are synchronized to transfer result data on a write bus 68 to write to the register file 60. The write control unit 64 is the centralized control for the write buses 68 which removes complexity compared to the plurality of functional units in dynamic scheduling.

Figure 6:
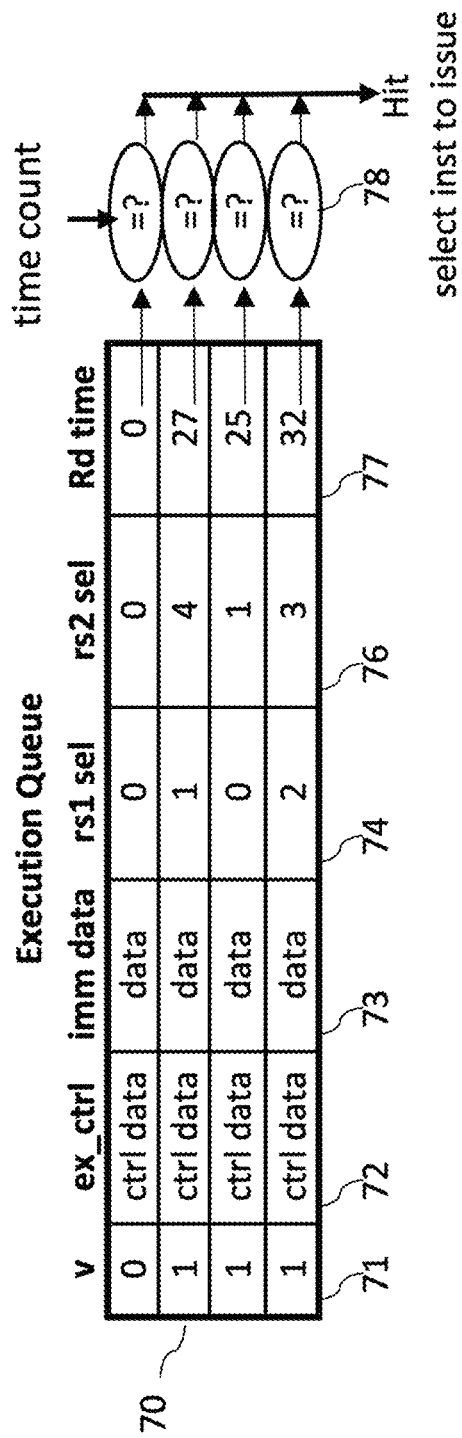
FIG. 6 is a block diagram illustrating an execution queue.

FIG. 6 illustrates an example of a 4-entry execution queue 70. The number of entries for the execution queue 70 is only an illustration. The invention is not limited to any number of execution queue 70 entries and the execution queue 70 could take the form of a single-entry execution queue. Each entry is an instruction waiting for execution by one of the functional units 75 or the load/store unit 80 according to the time count in the read time column 77. Each entry in the execution queue 70 preferably consists of the following fields: the valid bit 71, control data 72, the immediate data 73, the first source register select 74, the second source register select 76, and the read time 77. The valid bit 71 indicates that the entry is valid in the execution queue 70. The control data 72 specifies the specific operation to be used by the functional units 75 or the load/store unit 80. The immediate data 73 is an alternative to the second source register for the instruction. The valid indication for the immediate data 73 may be included in the control data field 72. Most instructions have an option to use immediate data 73 instead of data from the second source register. The first source register select 74 identifies which one of the read buses 66 has the operand data for the first source register. The second source register select 76 identifies which one of the read buses 66 has the operand data for the second source register. The source register selects 74, and 76 may not be used for some instructions.

Note that the destination register can be but does not need to be kept with the instruction. The write control unit 64 is responsible for directing the result data from a functional unit 75 to a write bus 68 to write to the register file 60. The execution queues 70 are only responsible for sending instructions to the functional units 75 or the load-store unit 80. The read time field 77 which has the read time of the instruction is synchronized with the read control unit 62. When the read time 77 is the same as the time count 90 as detected by the comparators 78, the instruction is issued to the functional units 75 or the load/store unit 80. For the example in FIG. 6, the entries are issued to the functional units out-of-order. The read time field 77 indicates that the second entry is issued at time count 25, the third entry is issued at time count 27, and the first entry is issued at time count 32.

In an embodiment, each functional unit 75 has its own execution queue 70. In another embodiment, an execution queue 70 dispatches instructions to multiple functional units 75. In this case, another field (not shown) can be added to the execution queue 70 to indicate the functional unit number for dispatching of instructions. In another embodiment, the even and odd functional units have independent even and odd execution queues.

Referring back to FIG. 1, the execution queues 70 are coupled to the load store unit (LSU) 80 and the functional units 75. The execution queues 70 issue the instructions to the functional units 75 or the load/store unit 80 when the read times 77 are the same as the time count 90. If the instruction is a load/store, then it is dispatched to the LSU 80, else it is dispatched to one of the functional units 75. The LSU 80 and functional units 75 are also coupled to the read buses 66 and write buses 68 to access the register file 60. The source operand data are fetched from register file 60 and transported on read buses 66 to the LSU 80 and functional units 75. The result data from the LSU 80 and functional units 75 are transported on write buses 68 to write to destination registers in the register file 60. The LSU 80 is also coupled to the data cache 85. The LSU 80 executes the load and store instructions to read and write data from the data cache 85. If the data are not in the data cache 85, then the cache miss causes that cache line to be fetched from external memory (not shown). Typically, the functional units 75 perform different operations, e.g., ALU, multiply, divide, branch, etc. In other embodiments, the functional units 75 perform the same function, for example, multiple ALUs. The invention is not limited to integer functional units. In other embodiments the functional units include floating point units, digital-signal processing units, vector processing units, or custom designed units.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention.

Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

What is claimed is:

1. A processor comprising:
a register file comprising a plurality of registers organized into at least two register sets, each register set comprising a subset of the plurality of registers;
a plurality of functional units coupled to at least one register set;
an instruction issue unit receiving a first instruction, and issuing the first instruction if registers referenced by the first instruction are in one of the two register sets and the first instruction is assigned to be executed by a functional unit associated with the register set referenced by the first instruction;
an execution queue coupled to the instruction issue unit to receive the first instruction from the instruction issue unit, and dispatch the first instruction to the functional unit associated with the register set referenced by the first instruction; and
a register renaming unit that renames a destination register of the first instruction to a register in a register set corresponding to the register set of a source register for the first instruction, wherein the register renaming unit renames destination registers of instructions in an iteration of a loop to a first register set of the register file and renames the destination registers of instructions in another iteration of the loop to another register set of the register file.

2. The processor of claim 1 wherein the register renaming unit renames destination registers of instructions in a basic block to a register set of the register file, wherein the basic block is defined as a straight-line code sequence with no branches in except to an entry point, and no branches out except at an exit point.

3. The processor of claim 1 further comprising:
a plurality of sets functional units, each set of functional units coupled to a corresponding register set; and
a plurality of sets of read and write buses separately coupled to a corresponding set of functional units and register sets;
wherein the read and write buses independently transport data between a corresponding register set and a corresponding set of functional units.

4. A processor comprising:
a register file comprising a plurality of registers organized into at least two register sets, each register set comprising a subset of the plurality of registers;
a plurality of functional units coupled to at least one register set;
an instruction issue unit receiving a first instruction, and issuing the first instruction if registers referenced by the first instruction are in one of the two register sets and the first instruction is assigned to be executed by a functional unit associated with the register set referenced by the first instruction; and
an execution queue coupled to the instruction issue unit to receive the first instruction from the instruction issue unit, and dispatch the first instruction to the functional unit associated with the register set referenced by the first instruction;
wherein the register file comprises a plurality of vector registers, wherein the functional units are vector functional units, and wherein the register file is organized as a plurality of vector register sets each coupled to a corresponding one of the plurality of vector functional units that execute in parallel.

5. The processor of claim 4 wherein the vector functional units are organized into sets of vector functional units, the processor further comprising:
a plurality of sets of read buses and write buses separately coupled to a corresponding set of vector functional units and register sets;
wherein a vector instruction references to a plurality of vector registers, each of the plurality of vector registers corresponding to a different register set of the register file, the vector instruction operating to execute concurrently with the plurality of vector registers.

6. The processor of claim 5 further comprising a plurality of shared read buses and write buses coupled to a plurality of register sets of the register file and a plurality sets of functional units wherein the shared read buses and write buses transport data between the plurality of register sets of the register file and the plurality sets of functional units.

7. The processor of claim 6 employing one of the plurality of shared read and shared write buses to transport data to or from a functional unit when a corresponding write or read bus is not available.

8. A processor as in claim 6 further comprising:
a clock unit;
a time counter storing a time count representing a current time of the processor, wherein the time count is incremented periodically with each clock cycle of the clock unit, the time counter comprising an N-bit counter wherein an Nth-bit count value represents a largest future time for the instruction issue unit to issue an instruction, and the N-bit counter returns to a zero count after reaching the Nth-bit value.

9. The processor of claim 7 further comprising:
a register scoreboard storing a write time of a register in the register file, wherein the write time represents a future time of the time count;
an instruction decode unit coupled to the register scoreboard, wherein the instruction decode unit reads at least one write time for an instruction from the register scoreboard, and uses the at least one write time to determine an execution time for the instruction; and
a time-resource matrix unit comprising a plurality of the time-resource registers for storing information relating to available resources for each time count of the N-bit time counter, and wherein the time-resource registers store information for resources that include at least one of: a plurality of read buses, a plurality of write buses, and a plurality of each type of functional units.

10. The processor of claim 9, wherein the time-resource registers comprise a first plurality of resources for a first register set of the register file and a second plurality of resources for a second register set of the register file.

11. The processor of claim 10, wherein the time-resource registers include a plurality of shared resources for a plurality of register sets of the register file.

12. The processor of claim 8 further comprising:
a read control unit having registers storing time count entries specifying when operands may be read and transported on a read bus, and wherein the read bus control unit further accesses a register scoreboard to determine availability of a first register in a register file, wherein if a write time of the first register is the same as the time count, data is forwarded instead of being read from the register file; and
a write control unit having write bus control registers storing time count entries specifying when result data may be transported on a write bus and written to a second register of the register file, and wherein the write control unit further accesses the register scoreboard to clear a valid bit if the write time stored in the write bus control register is the same as the time count.

13. The processor of claim 12 wherein the execution queue stores a plurality of instructions, and each instruction includes a read time which is represented by a future time count wherein the execution queue dispatches instructions to at least one functional unit and wherein the read bus control unit is synchronized with a read time in the execution queue.

14. A processor comprising:
a clock unit;
a time counter storing a time count representing a specific time of operation of the processor, wherein the time count is incremented by the clock unit;
a register file comprising a plurality of registers organized into at least two register sets, each register set comprising a subset of the plurality of registers;
a plurality of functional units coupled to at least one register set;
a register scoreboard storing a write time of a register in a register file, wherein the write time is a future time specified by the time count;
a time-resource matrix coupled to the register scoreboard and the time counter for storing information relating to available resources for each time count of the time counter;
an instruction issue unit receiving a first instruction, and issuing the first instruction if registers referenced by the first instruction are in a register set and if the first instruction is assigned to be executed by a functional unit that is associated with the register set referenced by the first instruction;
an execution queue coupled to the time counter and the instruction issue unit to receive the first instruction from the instruction issue unit, and dispatch the first instruction to a functional unit when a preset execution time matches the time count;
an instruction decode unit coupled to the register scoreboard, the instruction decode unit reading write times for source operands of an instruction from the register scoreboard, and using the write times to determine an execution time for the instruction; and
wherein the available resources include at least one of a plurality of read buses, a plurality of write buses, and a plurality of functional units.

15. A method implemented in a processor for receiving a first instruction and issuing the first instruction to an execution queue wherein registers referenced by the first instruction are in a register set of a register file and the first instruction is executed by a functional unit associated with that register set and wherein the register file comprises a plurality of registers organized into a at least two register sets, each register set comprising a subset of the plurality of registers;
the method further comprising,
renaming a destination register of an instruction to a first selected register set of the register file if source registers associated the instruction are in the first selected register set of the register file;
renaming the destination registers of instructions in first iteration of a loop to a second selected register set of the register file; and
renaming the destination registers of instructions in another iteration of the loop to another register set of the register file.

16. The method of claim 15 further comprising:
renaming the destination registers of instructions in a basic block to a third selected register set of the register file wherein the basic block is defined as a straight-line code sequence with no branches in except to an entry point, and no branches out except at an exit point.

17. A method implemented in a processor for receiving a first instruction and issuing the first instruction to an execution queue wherein registers referenced by the first instruction are in a register set of a register file and the first instruction is executed by a functional unit associated with that register set and wherein the register file comprises a plurality of registers organized into a at least two register sets, each register set comprising a subset of the plurality of registers;
wherein the register file comprises a plurality of vector registers, wherein the functional units are vector functional units, wherein a plurality of elements of the vector registers are executed in parallel and wherein the register file is organized as a plurality of vector register sets each coupled to a corresponding one of the plurality of vector functional units.

18. The method of claim 17 wherein a vector instruction references to a plurality of vector registers wherein the plurality of vector registers is from different register sets of the register file, wherein dedicated sets of read and write buses to couple the register sets to sets of vector functional units to execute the plurality of vector registers concurrently.

19. The method of claim 18 further comprising:
renaming the destination registers of instructions in first iteration of a loop to a register set of the register file; and
renaming the destination registers of instructions in another iteration of the loop to another register set of the register file;
wherein a plurality of shared read buses and write buses are coupled to a plurality of register sets of the register file and a plurality sets of functional units;
wherein the share read buses and write buses transport data between the plurality of register sets of the register file and the plurality sets of functional units.

20. The method of claim 19 further comprising issuing the first instruction to the execution queue at a future time wherein the future time is a time count from a periodically incremented time counter wherein the time counter provides a maximum time count corresponding to a latest future time to issue an instruction.

21. The method of claim 20 further comprising:
storing a write time of a register of a register file wherein the write time is a future time defined by the time count; and
storing information corresponding to available resources for each time count in a time-resource matrix, wherein the resources comprise at least one of a plurality of read buses, a plurality of write buses, and a plurality of functional units.

22. The method of claim 21, wherein the time-resource matrix includes a plurality of dedicated resources for a register set of the register file.

23. The method of claim 22, wherein the time-resource matrix includes a plurality of shared resources for a plurality of register sets of the register file.

24. The method of claim 23 further comprising:
storing in a register of a read control unit a read time that specifies when data may be read from a register file and transported on a read bus;

storing in a register of a of a write control unit a write time that specifies when result data may be transported on a write bus and written to a register of the register file;

storing a plurality of instructions in an execution queue, wherein each instruction includes a read time defined by the time count; and synchronizing the read time of the execution queue with the read control unit.

25. A processor comprising:

a register file comprising a plurality of registers that are organized into register sets comprising at least an odd register set and an even register set, the odd register set and the even register set each comprising a subset of the plurality of registers;

a first set of functional units coupled to at least the odd register set;

a second set of functional units coupled to at least the even register set;

an instruction issue unit receiving a first instruction, and identifying the one of the register sets corresponding to the source registers for the first instruction and renaming with a register renaming unit a destination register for the first instruction to the one of the register sets corresponding to the source registers for the first instruction; and an execution queue coupled to the instruction issue unit to receive the first instruction from the instruction issue unit, and dispatch the first instruction to a functional unit that corresponds to the one of the register sets corresponding to the source registers for the first instruction;

the register renaming unit renaming destination registers of instructions in a first iteration of a loop to the odd register set of the register file and renaming destination registers of instructions in a second iteration of the loop to the even register set of the register file.

* * * * *